United States Patent Office 3,637,564
Patented Jan. 25, 1972

---

3,637,564
DISSOLUTION OF POLYACRYLAMIDES
Peter Economou, Bedford, Mass., assignor to American Cyanamid Company, Stamford, Conn.
No Drawing. Continuation-in-part of abandoned application Ser. No. 546,214, Apr. 29, 1966. This application July 22, 1969, Ser. No. 843,806
Int. Cl. C08f *29/00, 29/34, 47/18*
U.S. Cl. 260—29.6 H     9 Claims

ABSTRACT OF THE DISCLOSURE

The dissolution of dry particulate anionic vinyl polymers in water is accelerated when the water has a dissolved content of a cationic polyamine and an ionization suppressor for the anionic substituent of the polymer.

---

This is a continuation-in-part of my copending application Ser. No. 546,214, filed on Apr. 29, 1966 and now abandoned.

The present invention relates to a method for increasing the rate at which water-soluble anionic acrylamide polymers in dry particulate state dissolve in aqueous media.

It is a serious disadvantage of water-soluble anionic acrylamide polymers that the rate with which they dissolve in water is slow. When added as coarse powders to water the particles normally take more than 6 hours to dissolve at room temperature. More rapid dissolution does not occur when the polymers are added to the water as fine powders, because then in most instances the particles of the powder swell and become sticky and cohere to form a mass into which water does not penetrate and which therefore takes even longer to dissolve.

The discovery has now been made that the rate at which the normally water-soluble anionic polyacrylamides dissolve in aqueous medium is increased when the water in which they are dissolved has a dissolved content of a cationic polyamine and an ionization suppressor for the anionic substituents of the polymeric material. As a result, in preferred instances I have been able to decrease the time required for dissolving water-soluble anionic polyacrylamide to about 10 minutes.

In the practice of the invention the solvent solution is prepared by adding a water-soluble cationic polyamine and a suppressor of anionic ionization in appropriate amounts to a quantity of water. The respective amounts of these materials in any instance depend upon the cationic density of the cationic material and the electrostatic potential of the substituents therein, and on the specific effectiveness of the ionization suppressor. In general, the more of each material which is present in the solution the more rapidly the anionic polyacrylamide dissolves, and best solubilization is effected when the amount of ionization suppressor is sufficient to suppress anionic ionization by more than 99%. Suitable amounts in any instance can be readily found by laboratory trial.

As a practical matter about 5% (based on the weight of the anionic polymer) is the least amount of polyamine which makes the process worthwhile, so that this amount appears to be the practical minimum. On the other hand, the improvement per increment of polyamine employed becomes minor when the weight of the polyamine employed is about twice the weight of the anionic polymer which is added. Preferred amounts in any instance vary with the strength of the cationic substituents present and with the number of these substituents which are present.

With regard to the ionization suppressor, any amount, however small, appears to confer some advantage, so that there does not appear to be a lower limit. Best improvement in speed appears to be achieved when the amount of ionization suppressor is sufficient to suppress the ionization of the anionic substituents substantially completely, e.g. to the extent of 99.9%. A a rule of thumb, substantially complete suppression of ionization is generally achieved by decreasing the pH of the solution below 3 or by the use of 20%–40% (based on the weight of the anionic component) of a water-soluble salt of a polyvalent metal with a monovalent anion. These agents vary in their effectiveness due largely to differences in their ionization potential and pK values. Suitable amounts of cationic polyamine and ionization suppressor in any instance can be readily found by laboratory trial.

The polyacrylamide is then added to the solution of the polyamine and the ionization suppressor. The polyacrylamide is most advantageously added in the form of a coarse powder, with sufficient stirring to form a uniform slurry, but if desired it may be added as a powder of any degree of fineness. The polymer is best added as a uniform stream with sufficient stirring so that the polymer which is in undissolved state are uniformly distributed through the solvent medium.

Aqueous polyacrylamide solutions become too viscous to stir when the polymer content of the solution is in excess of about 5%–25% by weight (depending on the molecular weight of the polyacrylamide), and hence the present invention does not contemplate the addition of polymer much beyond the limit of stirrability.

The polyacrylamides to which the present invention is applicable are those which are at least about 80 mol percent composed of acrylamide linkages. Of the remaining linkages, sufficient are anionic to render the polymer as a whole anionic. The remainder may be diluent linkages of such type that the resulting polymer is water-soluble. Suitable anionic linkages are those represented by

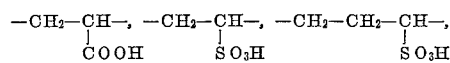

and

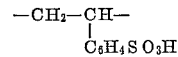

such as are respectively introduced by the copolymerization of acrylamide with acrylic acid, alkyl sulfonic acid, and styrenesulfonic acid. Any polyamine can be used which is water-soluble and which possesses the comparatively slight electrostatic potential needed to qualify it for use as a wet- or dry-strength agent. While best results appear to have been obtained with polyamines of high cationic density, excellent results have been obtained with polyamines which contain cationic substituents in such small ratio as one basic nitrogen atom for every 13 carbon atoms present, so that evidently the comparatively weak water-soluble cationic polyamines are useful as well. Suitable polyamines include polyethylenimine, the water-soluble 1:1 molar ratio adipic acid:diethylenetriamine (or tetraethylenepentamine) condensate (with or without subsequent reaction with epichlorohydrin); polyvinyl pyridine; polyvinylpyridine quaternized with methyl bromide; the water-soluble thermosetting urea-formaldehydetriethylene-tetramine and melamine-formaldehyde-triethylenetetramine wet strength resins for paper, and the 90:10 molar ratio acrylamide:diallyldimethyl ammonium chloride copolymer. The polyamines may be of high molecular weight, but good results are obtained with diethylenetriamine, tetraethylene pentamine. The low molecular weight water-soluble condensates of ammonia with epichlorohydrin, etc.

Suitable ionization suppressors include the strong organic and inorganic acids (those having a pK less than 6) for example sulfuric acid hydrochloric acid, phosphoric acid and trichloroacetic acid, together with the salts of polyvalent metals with monovalent anions, for example aluminum chloride, titanium tetrachloride, calcium chloride and magnesium chloride.

The invention is further illustrated by the examples, which represent preferred embodiments of the invention and which are not to be construed as limitations thereon.

EXAMPLE 1

The following illustrates a method for the quick dissolution in water of a water-soluble anionic acrylamide polymer in dry particulate state.

An aqueous solution of a cationic polyamine is prepared by reacting to the point of incipient gelation methylamine, ammonia and epichlorohydrin in 1:0.2:1.6 molar ratio, the epichlorohydrin being added slowly to a solution of the methylamine and ammonia in water, concentrated aqueous sodium hydroxide being added as needed as acid acceptor. The resulting polymer has a molecular weight in excess of 10,000 and the solution is diluted to 10% solids.

To 500 g. of this solution is added with stirring sufficient concentrated sulfuric acid to depress the pH of the solution to 2, which is sufficient to suppress more than 99% of the ionization of the polymer to be added. Into this solution at room temperature is sifted 50 g. of coarsely ground (approximately +10 −20 mesh) dry 90:10 acrylamide:acrylic acid copolymer of molecular weight 400,000, and the mixture is stirred. The copolymer particles dissolve in about 10 minutes. In the absence of the acid, the copolymer particles form tapioca-like spheres which do not dissolve in 24 hours. In the absence of the polyamine and the acid (i.e. in plain water) the copolymer takes at least six hours to dissolve.

EXAMPLE 2

The procedure of Example 1 is repeated except that the sulfuric acid is replaced by sufficient hydrochloric acid to decrease the pH to 2.5. The polyacrylamide dissolves substantially as readily as before.

EXAMPLE 3

The procedure of Example 1 is repeated except that the sulfuric acid is replaced by 50 g. of sodium sulfate, and the pH of the water is 7. The polyacrylamide dissolves readily in the aqueous medium.

EXAMPLE 4

The procedure of Example 3 is repeated with replacement of the sodium sulfate by 60 g. of aluminum chloride, with substantially the same results.

EXAMPLE 5

The procedure of Example 1 is repeated except that the polyamine is replaced by an equal weight of tetraethylenepentamine. Similar results are obtained.

EXAMPLE 6

The procedure of Example 1 is repeated except that the cationic resin solution is replaced by an equal amount of a 10% aqueous solution of the water-soluble thermosetting wet strength resin for paper prepared by reacting 1.2 mol of epichlorohydrin with a water-soluble molecular weight 1:1 molar ratio adipic acid:diethylenetriamine polyamidepolyamine and hydrochloric acid is used as the ionization suppressor in place of the sulfuric acid. Results are substantially the same.

EXAMPLE 7

To 100 g. of a 10% by weight solution of a water-soluble high molecular weight condensate prepared by reacting an anhydrous mixture of adipic acid and diethylenetriamine and dissolving the product in water is added sufficient trichloroacetic acid to decrease the pH of the solution to 2, and 20 g. of the acrylamide polymer of example in finely powdered state (approximately 200 mesh) is sifted into the solution with stirring over a 10 minute period. The powder dissolves uniformly and the solution is clear within 15 minutes after the start of the addition.

I claim:
1. A process of dissolving a dry particulate water-soluble anionic vinyl polymer at least 80 mol percent composed of —$CH_2CH(CONH_2)$— linkages, which comprises slurrying said polymer in water having a dissolved content of at least 5% based on the weight of said vinyl polymer of a cationic polyamine and an ionization suppressor selected from strong organic and inorganic acids and salts of polyvalent metals with monovalent anions for the anionic substituents of said polymer.

2. A process according to claim 1 wherein the polymer is composed of acrylamide and acrylic acid linkages in about 90:10 molar ratio.

3. A process according to claim 1 wherein the polyamine contains at least 2 basic amino nitrogen atoms for every 10 carbon atoms present.

4. A process according to claim 1 wherein the polyamine is tetraethylenepentamine.

5. A process according to claim 1 wherein the amount of ionization suppressor is sufficient to suppress more than 99% of the anionic ionization of said polymer.

6. A process according to claim 4 wherein the ionization suppressor is hydrochloric acid.

7. A process according to claim 1 wherein the ionization suppressor is a water-soluble salt of a polyvalent metal with a monovalent anion.

8. A process according to claim 7 wherein the salt is aluminum trichloride.

9. A process according to claim 7 wherein the salt is calcium chloride.

References Cited

UNITED STATES PATENTS

| | | | |
|---|---|---|---|
| 3,049,469 | 8/1962 | Davison | 162—164 |
| 3,332,834 | 7/1967 | Reynolds | 162—164 |
| 3,350,338 | 10/1967 | Savage | 260—29.6 |
| 3,402,137 | 9/1968 | Fischer et al. | 260—29.6 |
| 3,412,060 | 11/1968 | Sarem | 260—29.6 |
| 3,493,500 | 2/1970 | Volk et al. | 210—54 |

MELVIN GOLDSTEIN, Primary Examiner

U.S. Cl. X.R.

260—29.6 NR, SQ, M, N

UNITED STATES PATENT OFFICE
CERTIFICATE OF CORRECTION 23,148

Patent No. 3,637,564　　　　　　　　　Dated　January 25, 1972

Inventor(s) Peter Economou

It is certified that error appears in the above-identified patent and that said Letters Patent are hereby corrected as shown below:

Column 3 line 61, after "water-soluble" insert -- high --.

Signed and sealed this 30th day of May 1972.

(SEAL)
Attest:

EDWARD M. FLETCHER, JR.　　　　　　　ROBERT GOTTSCHALK
Attesting Officer　　　　　　　　　　　Commissioner of Patents